(12) United States Patent
Allen (10) Patent No.: US 11,794,499 B2
(45) Date of Patent: Oct. 24, 2023

(54) FILTERS

(71) Applicant: Hewlett-Packard Development Company, L.P., Spring, TX (US)

(72) Inventor: Michael Kenneth Allen, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 229 days.

(21) Appl. No.: 17/298,585

(22) PCT Filed: Apr. 4, 2019

(86) PCT No.: PCT/US2019/025824
§ 371 (c)(1),
(2) Date: May 30, 2021

(87) PCT Pub. No.: WO2020/204930
PCT Pub. Date: Oct. 8, 2020

(65) Prior Publication Data
US 2022/0009255 A1   Jan. 13, 2022

(51) Int. Cl.
*B41J 29/377* (2006.01)
*B01D 45/16* (2006.01)

(52) U.S. Cl.
CPC ............ *B41J 29/377* (2013.01); *B01D 45/16* (2013.01)

(58) Field of Classification Search
CPC ...... B41J 29/377; B41J 2/17563; B01D 45/16
See application file for complete search history.

(56) References Cited

U.S. PATENT DOCUMENTS

| | | | |
|---|---|---|---|
| 6,821,320 B1 | 11/2004 | Miyazaki | |
| 8,020,984 B2 | 9/2011 | Silverbrook et al. | |
| 8,097,057 B2 | 1/2012 | Arnold | |
| 2007/0097194 A1* | 5/2007 | Silverbrook | G06K 7/1417 |
| | | | 347/101 |
| 2017/0333918 A1 | 11/2017 | Hua et al. | |

FOREIGN PATENT DOCUMENTS

| | | |
|---|---|---|
| CN | 2068426 U | 1/1991 |
| CN | 203702399 U | 7/2014 |
| JP | 5262001 B2 | 8/2013 |
| KR | 101525033 B1 | 6/2015 |
| WO | WO-03047412 A2 | 6/2003 |

\* cited by examiner

*Primary Examiner* — Bradley W Thies
(74) *Attorney, Agent, or Firm* — Brooks, Cameron & Huebsch, PLLC (57) ABSTRACT

Example filters are disclosed herein. In an example, the filter includes a housing including a central axis, an inlet, and an outlet. The central axis extends perpendicularly to a fluid flow direction at the outlet. In addition, the filter includes an outlet flow path defined within the housing that extends angularly about the central axis to the outlet. Further, the filter includes a first plurality of vanes extending from a radially outer surface of the outlet flow path.

15 Claims, 9 Drawing Sheets

FILTERS

BACKGROUND

Particles (e.g., such as fine particles) may be suspended within a fluid stream. Typically, one may wish to filter out such particles from the fluid stream so as to avoid polluting an atmospheric environment that may be occupied by people or animals. In addition, the filtration of suspended particles from a fluid stream may be aimed at reducing or avoiding the accumulation of dust or dirt particles within a given environment or device.

BRIEF DESCRIPTION OF THE DRAWINGS

Various examples will be described below referring to the following figures.

DETAILED DESCRIPTION

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

As previously described, suspended particles (e.g., fine particles) may be filtered from a fluid stream in a variety of different contexts and for a variety of different purposes. For instance, a printer may include a plurality of fluid flow paths defined therein. In particular, a printer may include internal ducting or channels for flowing air therethrough, such as, for example, for providing thermal heat transfer, ventilation, etc. The fluids flowing along these fluid flow paths may include some amount of particles (e.g., fine toner particles, dust, droplets, etc.) suspended therein. To avoid polluting the environment surrounding the printer and/or to reduce the accumulation of particles within the printer, a filter (or multiple filters) may be included along the fluid flow paths to remove some or all of the suspended particles from the fluids flowing therethrough. Accordingly, examples disclosed herein include filters (and printers incorporating such filters) that are to capture and separate suspended particles from a fluid flow path. Thus, through use of the disclosed example filters, the fluid flowing along the fluid flow paths within a printer may have fewer or no suspended particles therein.

While the specific examples disclosed herein discuss filters for use within the fluid flow paths of a printer, it should be understood that the disclosed example filters may be used in a variety of contexts, including those outside of a printer. Therefore, reference to a printer is merely illustrative of one potential use of the disclosed example filters and should not be interpreted as limiting all potential uses thereof.

Figure 1:
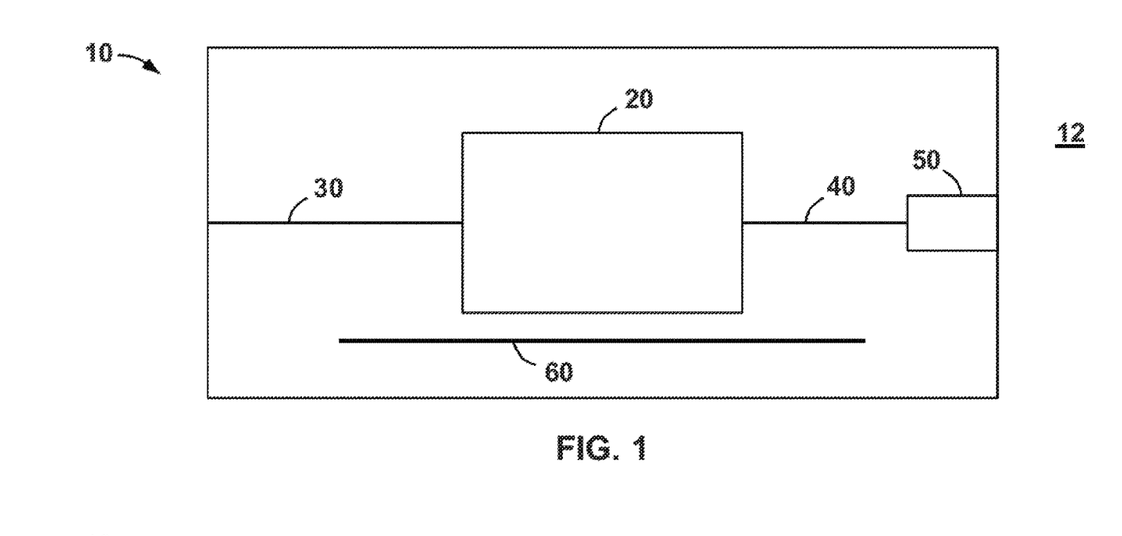
FIG. 1 is a schematic view of a printer according to some examples.

Referring now to FIG. 1, a printer 10 is shown that includes, among other things, a printing assembly 20 disposed therein. Printing assembly 20 is to deposit ink, toner, etc., onto print media 60 (e.g., paper) during printing operations. Printer 10 may be any suitable type of printer, such as, for example, an inkjet printer, a laser printer, a dot matrix printer, dye sublimation printer, LED printer, etc. In this example, printer 10 is a laser printer, and thus, printing assembly 20 is to deposit toner onto print media 60 to form an image (e.g., text, graphics, an image, etc.) thereon during operations.

In addition, printer 10 also includes a plurality of fluid flow paths defined therein that are fluidly coupled to printing assembly 20. For instance, in this example, printer 10 includes a first or intake fluid flow path 30, and a second or exhaust fluid flow path 40. Both the intake fluid flow path 30 and the exhaust fluid flow path 40 are fluidly coupled between the printing assembly 20 and the environment or atmosphere 12 that surrounds printer 10. Generally speaking, during operations intake fluid flow path 30 channels a fluid (e.g., air) from atmosphere 12 into printer 10 and toward printing assembly 20 to provide thermal energy transfer (e.g., convective cooling) to components and features therein (e.g., printing assembly 20). Also, during operations exhaust fluid flow path 40 channels fluid (e.g., air) from printer 10 (e.g., from or past printing assembly 20) to atmosphere 12 to exhaust thermal energy generated within printer 10.

During these operations, particles may be suspended within the fluids flowing along both the intake fluid flow path 30 and the exhaust fluid flow path 40. For example, the intake fluid flow path 30 may include dust particles or other suspended particles that were disposed within atmosphere 12, and that may accumulate to interfere within the internal components (e.g., printing assembly 20) of printer 10. As another example, exhaust fluid flow path 40 may include toner particles or other fine particles suspended therein that were emitted from internal components of printer 10 (e.g., printing assembly 20). Thus, in the example of FIG. 1, a filter 50 is disposed along the exhaust fluid flow path 40. In addition, referring now to FIG. 2, in other examples filter 50 is disposed along inlet flow path 30. In still other examples, both inlet fluid flow path 30 and exhaust fluid flow path 40 may include a filter 50. Various examples of filter 50 are now described in more detail below.

Figure 2:
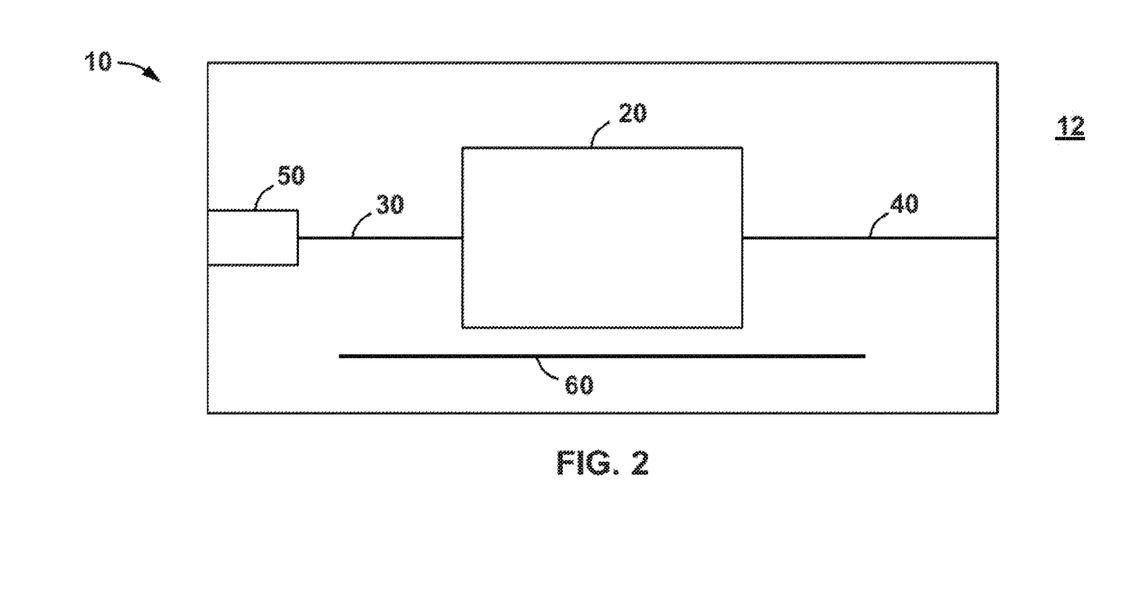
FIG. 2 is a schematic view of a printer according to some examples.
Figure 3:
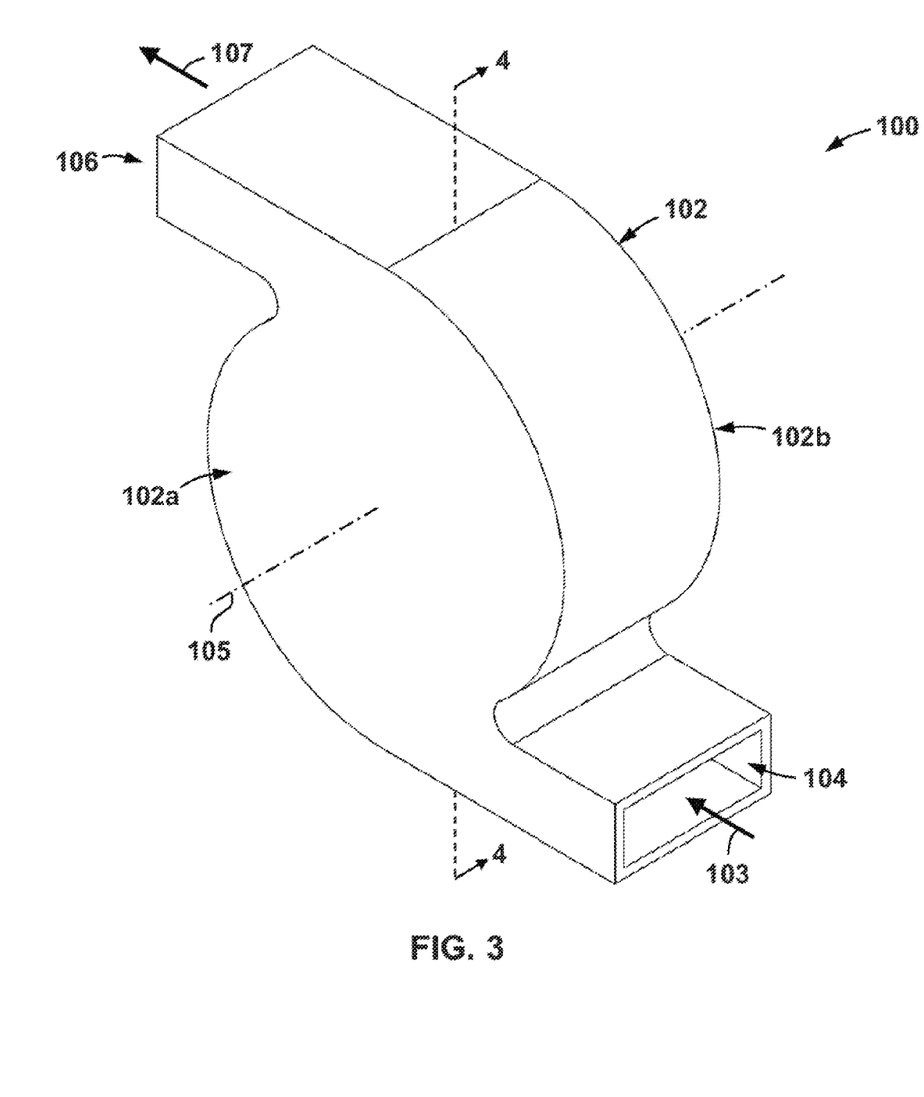
FIG. 3 is a perspective view of a filter for use within the printer of FIGS. 1 and 2 according to some examples.

Referring now to FIG. 3, an example filter 100 for use within printer 10 as filter 50 (see FIGS. 1 and 2) is shown. In this example, filter 100 includes a housing 102 including a central axis 105, a first side 102a, and a second side 102b opposite first side 102a. In addition, housing 102 includes an inlet 104 and an outlet 106 extending into housing 102. In this example, fluids flowing into housing 102 via inlet 104 are generally directed along a flow direction 103, while fluids flowing out of housing 102 via outlet 106 are generally directed along a flow direction 107. In this example, flow directions 103, 107 are generally parallel to one another, and both extend generally perpendicularly to central axis 105.

Figure 4:
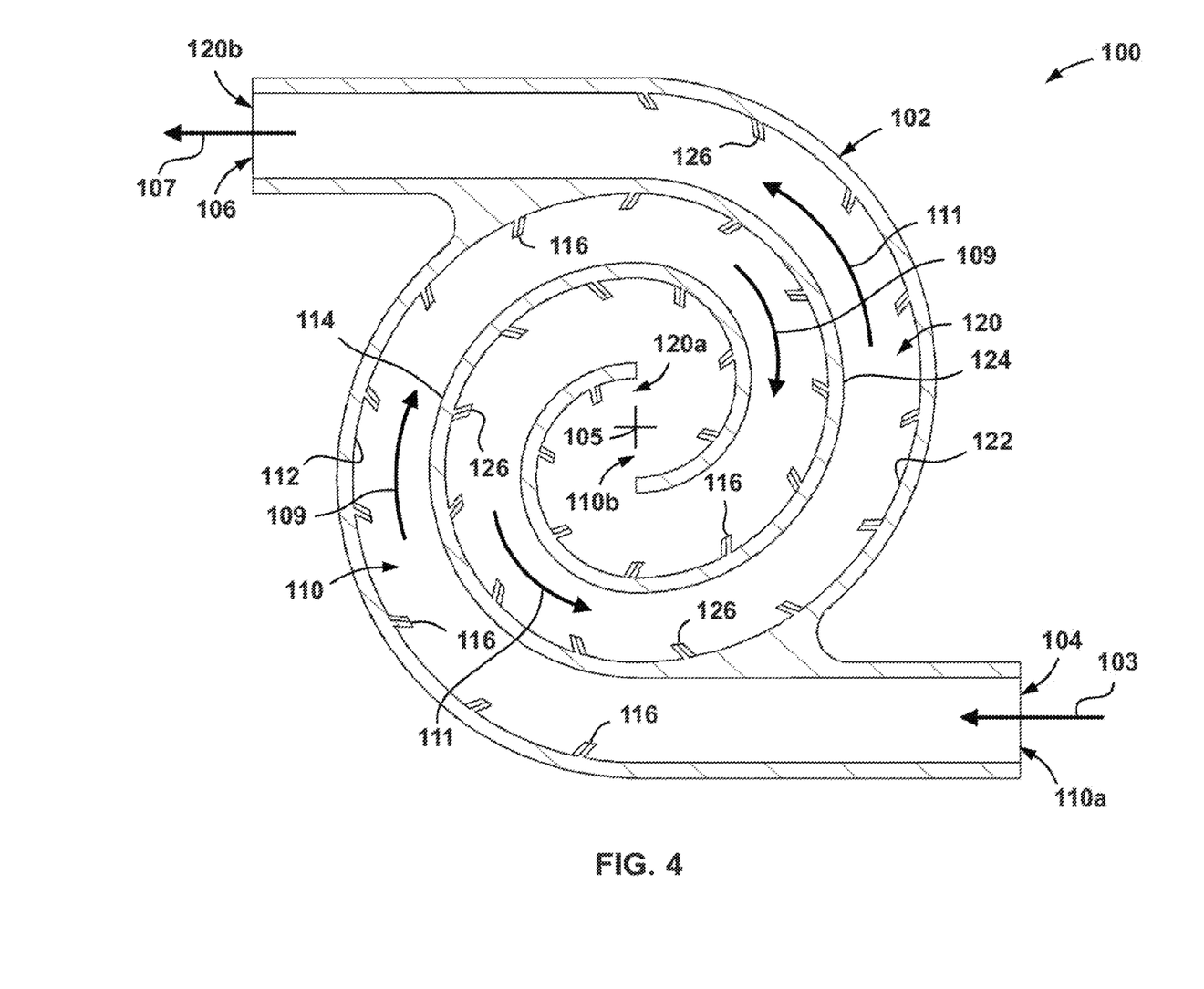
FIG. 4 is a cross-sectional view taken along section 4-4 in FIG. 3.

Referring now to FIG. 4, filter 100 also includes an inlet flow path 110 and an outlet flow path 120 that are defined within housing 102. In particular, inlet flow path 110 extends within housing 102 from a first or upstream end 110a at (or proximate to) inlet 104 to a second or downstream end 110b at (or proximate to) axis 105. In addition, outlet flow path 120 extends within housing 102 from a first or upstream end 120a at inlet flow path 110 to a second or downstream end 120b at (or proximate to) outlet 106.

In addition, inlet flow path 110 and outlet flow path 120 both spiral with respect to axis 105 between ends 110a, 110b and 120a, 120b, respectively, such that flow paths 110, 120 both extend angularly about axis 105. Specifically, in this example, inlet flow path 110 spirals inward toward central axis 105 from the upstream end 110a to downstream end 110b, while outlet flow path 120 spirals outward from central axis 105 from upstream end 120a to downstream end 120b. Thus, the inlet flow path 110 may have a generally decreasing radius of curvature from upstream end 110a to downstream end 110b, and outlet flow path 120 may have a generally increasing radius of curvature from upstream end 120a to downstream end 120b. Inlet flow path 110 and outlet flow path 120 may have any suitable spiral shape. For instance, in some examples, flow path 110 and/or flow path 120 may be disposed along logarithmic spiral, an arithmetic spiral, a parabolic spiral, a hyperbolic spiral, etc. In this example, the downstream end 110b of inlet flow path 110 and the upstream end 120a of outlet flow path 120 meet at axis 105, such that downstream end 110b of inlet flow path 110 and upstream end 120a of outlet flow path 120 are disposed at a central region of housing 102. Thus, during operations, fluid (e.g., air) enters housing 102 at inlet 104 flowing along a flow direction 103, and then spirals inward toward axis 105 along a flow direction 109 within inlet flow path 110 until the fluid reaches the ends 110b, 120a of flow paths 110, 120, respectively. Thereafter, the fluid spirals outward or away from axis 105 along a flow direction 111 within outlet flow path 120 and then eventually exits housing 102 from outlet 106 along flow direction 107.

Referring still to FIG. 4, the inlet flow path 110 includes a radially outer surface 112 and a radially inner surface 114 extending axially between sides 102a, 102b of housing 102 (see FIG. 3). Similarly, the outlet flow path 120 includes a radially outer surface 122 and a radially inner surface 124 extending axially between sides 102a, 102b of housing 102. Radially outer surface 112 and radially inner surface 114 extend along the spiral path of inlet flow path 110 so as to define the spiral path of inlet flow path 110 generally described above. Similarly, radially outer surface 122 and radially inner surface 124 extend along the spiral shaped path of outlet flow path 120 so as to define the spiral shaped path of outlet flow path 120 generally described above. A first plurality of ribs or vanes 116 extend from radially outer surface 112 of inlet flow path 110 and a second plurality of ribs or vanes 126 extend from radially outer surface 122 of outlet flow path 120.

Figure 5:
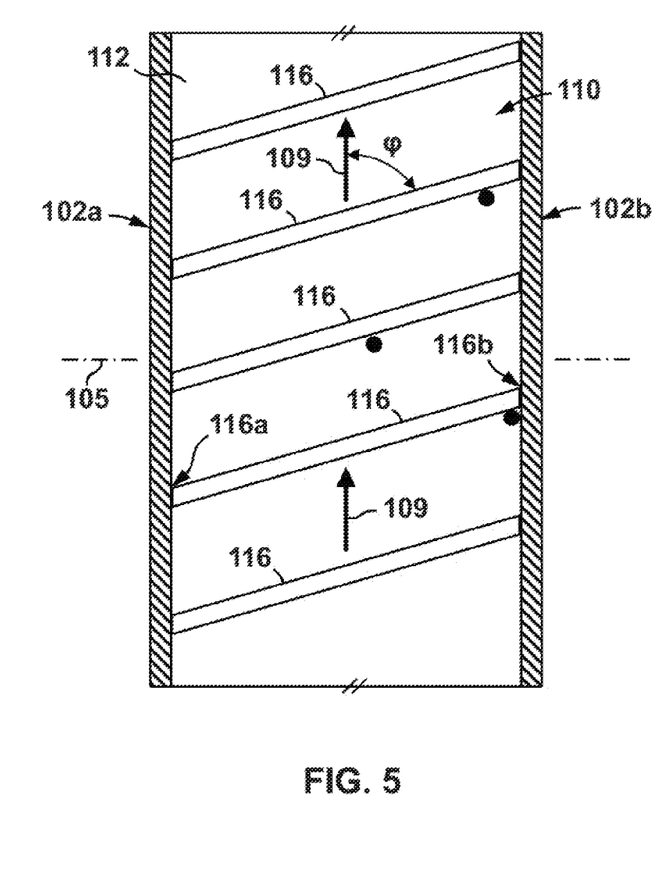
FIGS. 5 and 6 are top views of the vanes within the filter of FIG. 3 according to some examples.
Figure 6:
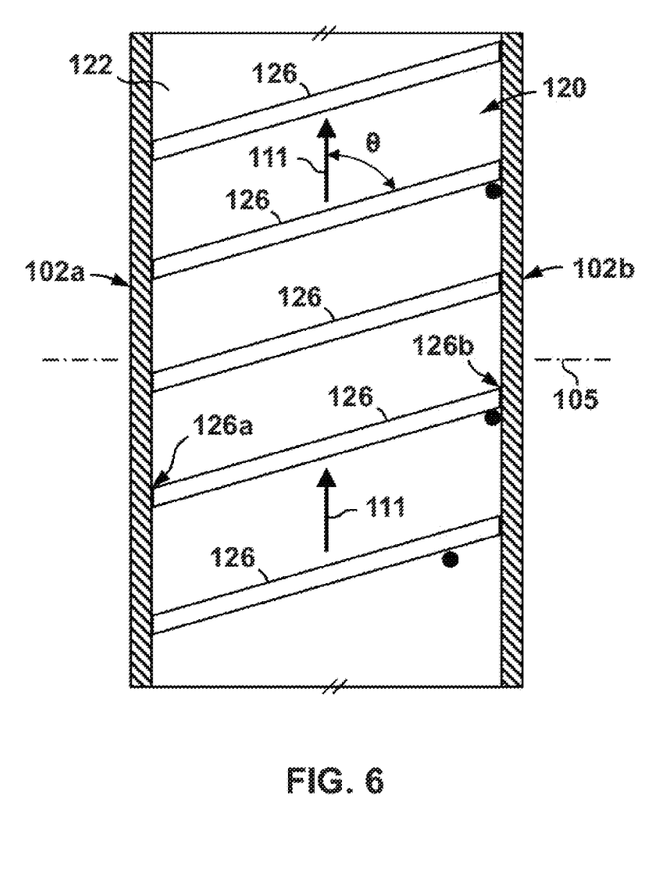

Referring now to FIGS. 5 and 6, vanes 116 are spaced from one another within inlet flow path 110 along the flow direction 109, and vanes 126 are spaced from one another within outlet flow path 120 along the flow direction 111. In some examples, the spacing of vanes 116, 126 is relatively even along flow paths 110, 120, respectively; however, vanes 116, 126 may be unequally or variably spaced in other examples. In addition, each vane 116 includes a first end 116a and a second end 116b opposite first end 116a, and each vane 126 includes a first end 126a and a second end 126b opposite first end 126a. First ends 116a, 126a of each vane 116, 126, respectively, are generally spaced from the corresponding second ends 116b, 126b in an axial direction with respect to axis 105. In particular, first ends 116a, 126a of vanes 116, 126, respectively, are disposed proximate first side 102a of housing 102 while second ends 116b, 126b of vanes 116, 126, respectively, are disposed proximate second side 102b of housing 102.

Further, in this example, each vane 116 extends between ends 116a, 116b along an angle $\varphi$ relative to the direction of flow 109 within inlet flow path 110, and each vane 126 extends between ends 126a, 126b along an angle $\theta$ relative to the direction of flow 111 within outlet flow path 120. The angles $\varphi$, $\theta$ may vary widely, and in some examples, may be greater than 0° and less than or equal to about 90°. In some of these examples, the angles $\varphi$, $\theta$ may be between 0 and 90° such that second ends 116b, 126b of vanes 116, 126 are disposed downstream of the corresponding first ends 116a, 126a. In some examples, the angles $\varphi$, $\theta$ are substantially equal, and in other examples, the angles $\varphi$, $\theta$ are different.

Figure 7:
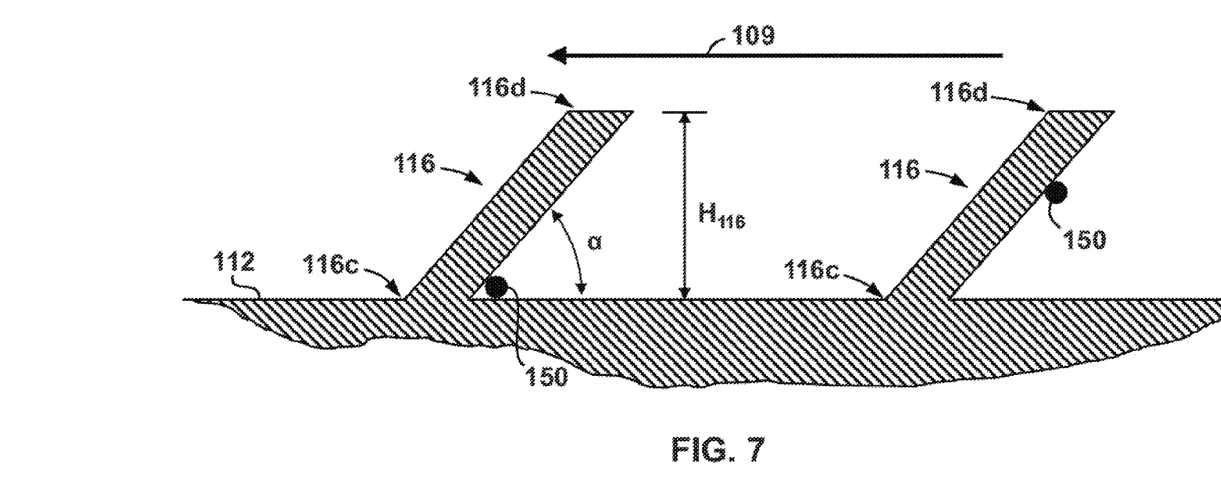
FIGS. 7 and 8 are side cross-sectional views of the vanes within the filter of FIG. 3 according to some examples.
Figure 8:
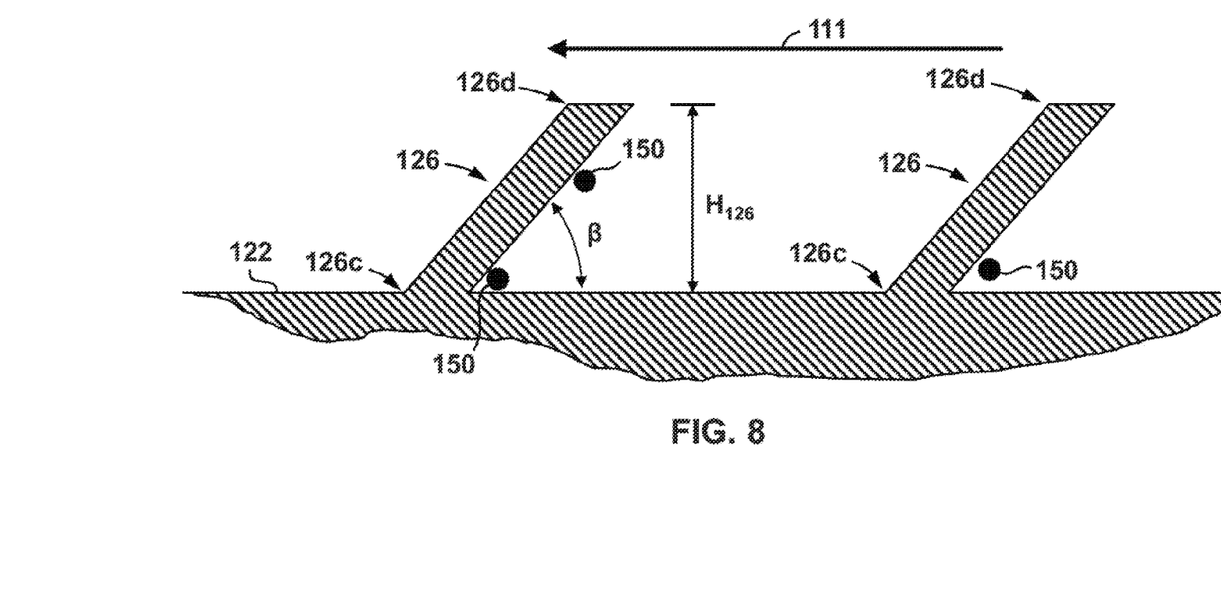

Referring now to FIGS. 7 and 8, vanes 116 generally extend outward from radially outer surface 112 of inlet flow path 110, and vanes 126 generally extend outward from radially outer surface 122 of outlet flow path 120. In particular, each vane 116 includes a base 116c disposed at radially outer surface 112 and a crest or top 116d spaced from base 116c. Similarly, each vane 126 includes a base 126c disposed at radially outer surface 122 and a crest or top 126d spaced from base 126c. In this example, vanes 116, 126 are integrally or monolithically formed with radially outer surface 112, 122, respectively. However, in other examples, vanes 116, 126 may be individual pieces or components that are secured to radially outer surfaces 112, 122, respectively.

Top 116d of each vane 116 is disposed at a height $H_{116}$ measured in the normal direction from radially outer surface 112, and top 126d of each vane 126 is disposed at a height $H_{126}$ measured in the normal direction from radially outer surface 122. Thus, heights $H_{116}$, $H_{126}$ may be referred to as "normal heights." The normal heights $H_{116}$, $H_{126}$ of vanes 116, 126, respectively, may be substantially equal in some examples, and may be different in other examples. For instance, in some examples, the normal heights $H_{116}$ of vanes 116 may be larger or smaller than the normal heights $H_{126}$ of vanes 126. In addition, the normal heights $H_{116}$ of vanes 116 may be substantially equal or they may be different along inlet flow path 110. For instance, in some examples, the heights $H_{116}$ of vanes 116 may increase or decrease (e.g., gradually, step-wise, etc.) when extending between ends 110a, 110b of inlet flow path 110. Similarly, the normal heights $H_{126}$ of vanes 126 may be substantially equal or they may be different along outlet flow path 120. For instance, in some examples, the heights $H_{126}$ of vanes 126 may increase or decrease (e.g., gradually, step-wise, etc.) when extending between ends 120a, 120b of inlet flow path 120. In addition, in some examples, the normal heights $H_{116}$, $H_{126}$ may increase or decrease within a given vane 116, 126, respectively, when moving from end 116a, 126a to end 116b, 126b (see e.g., FIGS. 5 and 6).

Referring still to FIGS. 7 and 8, in some examples, vanes 116, 126 extend perpendicularly or in a normal direction to radially outer surfaces 112, 122, respectively. However, in the example of FIGS. 6 and 7, vanes 116 extend outward from radially outer surface 112 at an angle α relative to radially outer surface 112, and vanes 126 extend outward from radially outer surface 122 at an angle β relative to radially outer surface 122. The angles α, β may vary widely, however, in the example of FIGS. 7 and 8 the angles α, β are both greater than 0° and less than about 90°. As a result, in this example, the tops 116d, 126d of vanes 116, 126, respectively, are disposed upstream of the corresponding bases 116c, 126c with respect to the flow directions 109, 111 along flow paths 110, 120, respectively. Accordingly, vanes 116, 126 lean in an upstream direction within flow paths 110, 120, respectively. In some examples, the angles α, β are substantially equal, and in other examples, the angles α, β are different. In addition, the angles α of vanes 116 may be substantially equal or they may be different along inlet flow path 110, and the angles β of vanes 126 may be substantially equal or they may be different along outlet flow path 120.

Referring now to FIGS. 1-4, during operations filter 100 is disposed along first fluid flow path 30 and/or second fluid flow path 40 within printer 10 and fluid (e.g., air) with particles (e.g., fine toner particles) suspended therein is flowed therethrough. In particular, the fluid enters housing 102 at inlet 104 and then flows along inlet flow path 110, outlet flow path 120, and finally exits housing 102 at outlet 106. During this process, the fluid is spiraled in toward axis 105 along flow direction 109 while in the inlet flow path 110 and spiraled outward from axis 105 along direction 111 while in the outlet flow path 120 as previously described above. The spiraling of the inlet flow path 110 and the outlet flow path 120 imparts a centrifugal force to the fluid such that the suspended particles are forced radially outward toward radially outer surfaces 112, 122 of flow paths 110, 120, respectively. Because vanes 116, 126 extend outward from radially outer surfaces 112, 122 as previously described, the particles engage with and are therefore captured by vanes 116, 126, while the fluid is allowed to continue flowing along flow directions 109, 111 as previously described. Accordingly, when the fluid exits housing 102 at outlet 106, the amount of particles suspended within the flowing fluid is reduced if not entirely eliminated.

Referring briefly again to FIGS. 7 and 8, in this example, because vanes 116, 126 lean in an upstream direction as previously described above, particles (such as particles 150 shown in FIGS. 7 and 8) are prevented (or at least restricted) from advancing past the vanes 116, 126 once they are engaged therewith. In particular, without being limited to this or any other theory, the upstream lean of vanes 116, 126 causes the fluid flowing along flow directions 109, 111, respectively, to drive the particles 150 along vanes 116, 126 toward bases 116c, 126c, respectively, and therefore away from tops 116d, 126d, respectively.

Referring briefly again to FIGS. 5 and 6, because second ends 116b, 126b of vanes 116, 126 are disposed downstream of the corresponding first ends 116a, 126a, in this example, particles 150 that are captured by vanes 116, 126 are driven or channeled toward second side 102b of housing 102. In particular, without being limited to this or any other theory, the orientation of the vanes 116, 126 as shown in FIGS. 5 and 6 causes the fluid flowing along flow directions 109, 111, respectively, to drive the particles 150 along vanes 116, 126 toward second ends 116b, 126b and therefore second side 102b of housing 102. Thus, in some examples, second side 102b (or a wall disposed thereon) is removable or detachable from housing 102 such that particles 150 collected at (or proximate to) second side 102b may be removed therefrom.

Figure 9:
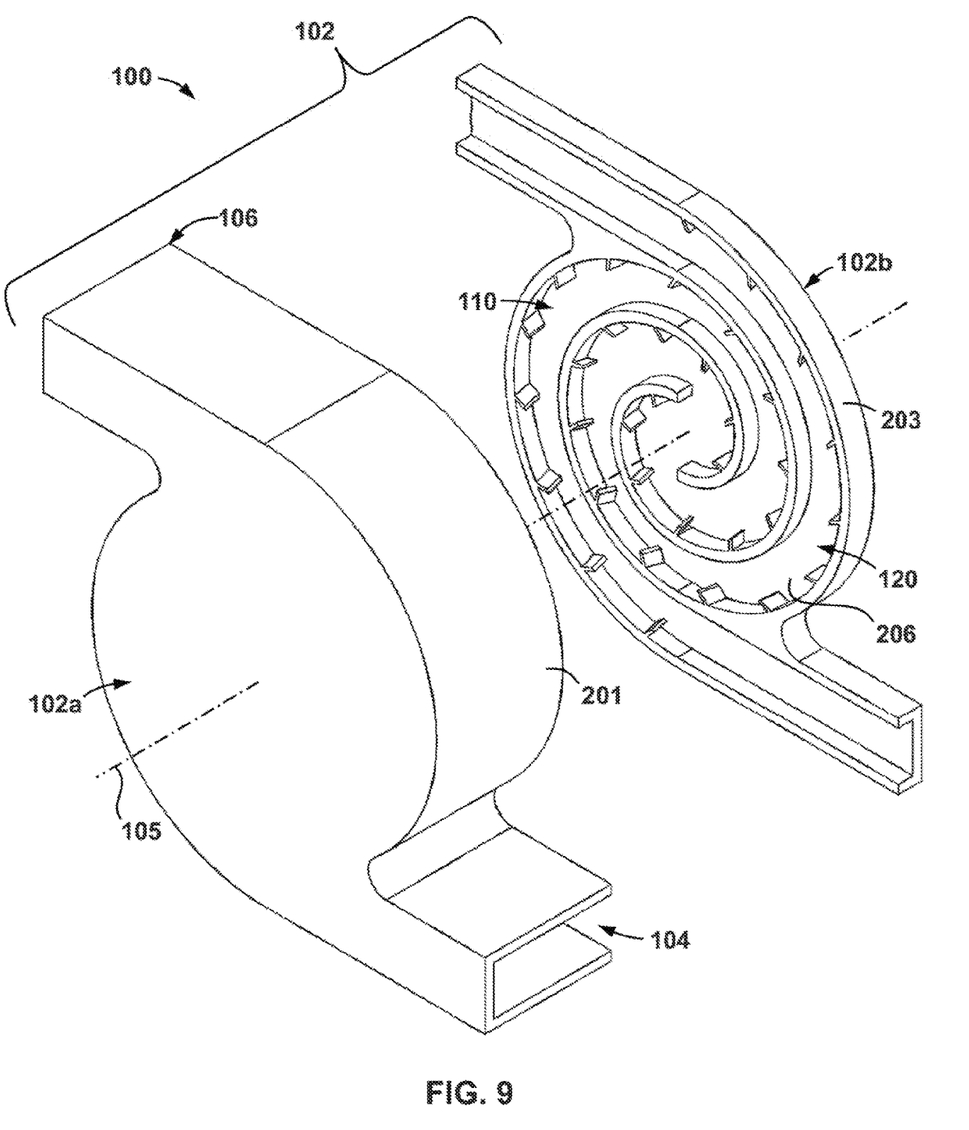
FIG. 9 is a perspective view of a filter for use within the printer of FIGS. 1 and 2 according to some examples.

In particular, referring now to FIG. 9, in some examples housing 102 of filter 100 may include a first portion 201 and a second portion 203. First portion 201 extends from first side 102a and defines a portion of flow paths 110, 120, while second portion 203 extends from first portion 201 to second side 102b and defines a second, remaining portion of flow paths 110, 120. Second portion 203 includes a wall 206 that extends along second side 102b. Thus, during operations, with reference again to FIGS. 5 and 6, the above described orientation of vanes 116, 126 within flow paths 110, 120, respectively, in this example directs or channels the captured particles 150 toward wall 206. Accordingly, when it is desired to clean out captured particles 150 from filter 100, second portion 203 may be detached from first portion 201 so as to access the captured particles 150. In addition, in some examples, some or all portions of second portion 203, such as, for example, wall 206, may be arranged to attract and hold particles 150 that are engaged therewith. For example, wall 206 (and/or other portions of second portion 203) may be coated with an adhesive or may have a relatively rough surface texture that is to capture and attract filtered particles 150 during operations. As a result, in these examples, when it is desired to clean captured particles 150 from filter 100, most (or substantially all) of the particles 150 disposed within housing 102 may be removed therefrom by detaching second portion 203 from first portion 201, and then either cleaning or replacing second portion 203.

Figure 10:
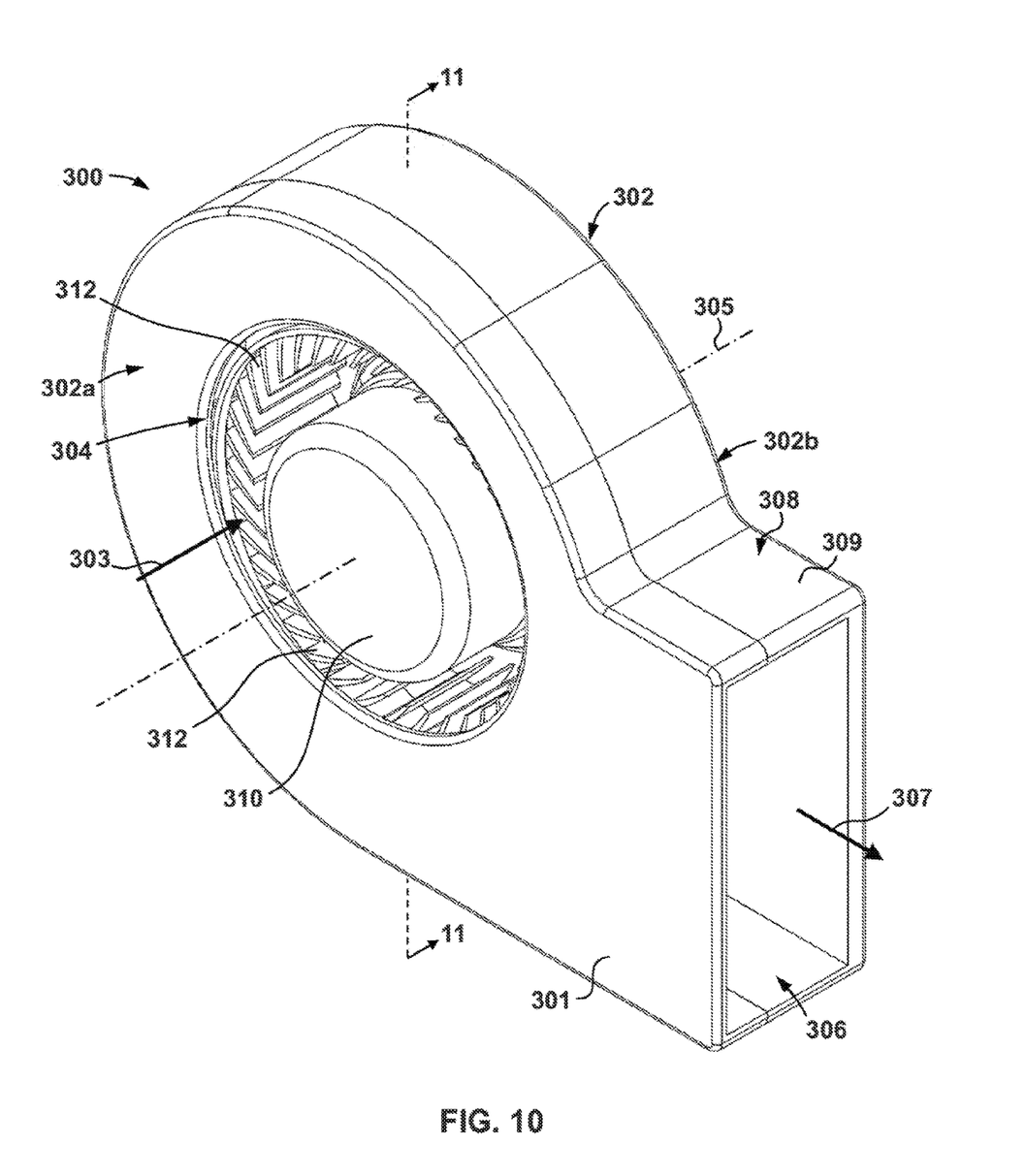
FIG. 10 is a perspective view of a filter for use within the printer of FIGS. 1 and 2 according to some examples.

Referring now to FIG. 10, an example filter 300 for use within printer 10 as filter 50 (see FIGS. 1 and 2) is shown. In this example, filter 300 includes a housing 302 including a central axis 305, a first side 302a, and a second side 302b opposite first side 302a. In addition, housing 302 includes an inlet 304 and an outlet 306 extending into housing 302. In this example, fluids flowing into housing 302 via inlet 304 are generally directed along a flow direction 303, while fluids flowing out of housing 302 via outlet 306 are generally directed along a flow direction 307. Flow direction 303 extends generally along or parallel to axis 305, and flow direction 307 extends generally perpendicularly to axis 305. Thus, inlet 304 is disposed along first side 302a of housing 302. In addition, as best shown in FIG. 10, in this example, housing 302 comprises a first section 301 axially extending from first side 302a and a second section 309 extending axially from first side 302a to second side 302b. First and section sections 301, 309 are coupled to one another to form housing 302.

Figure 11:
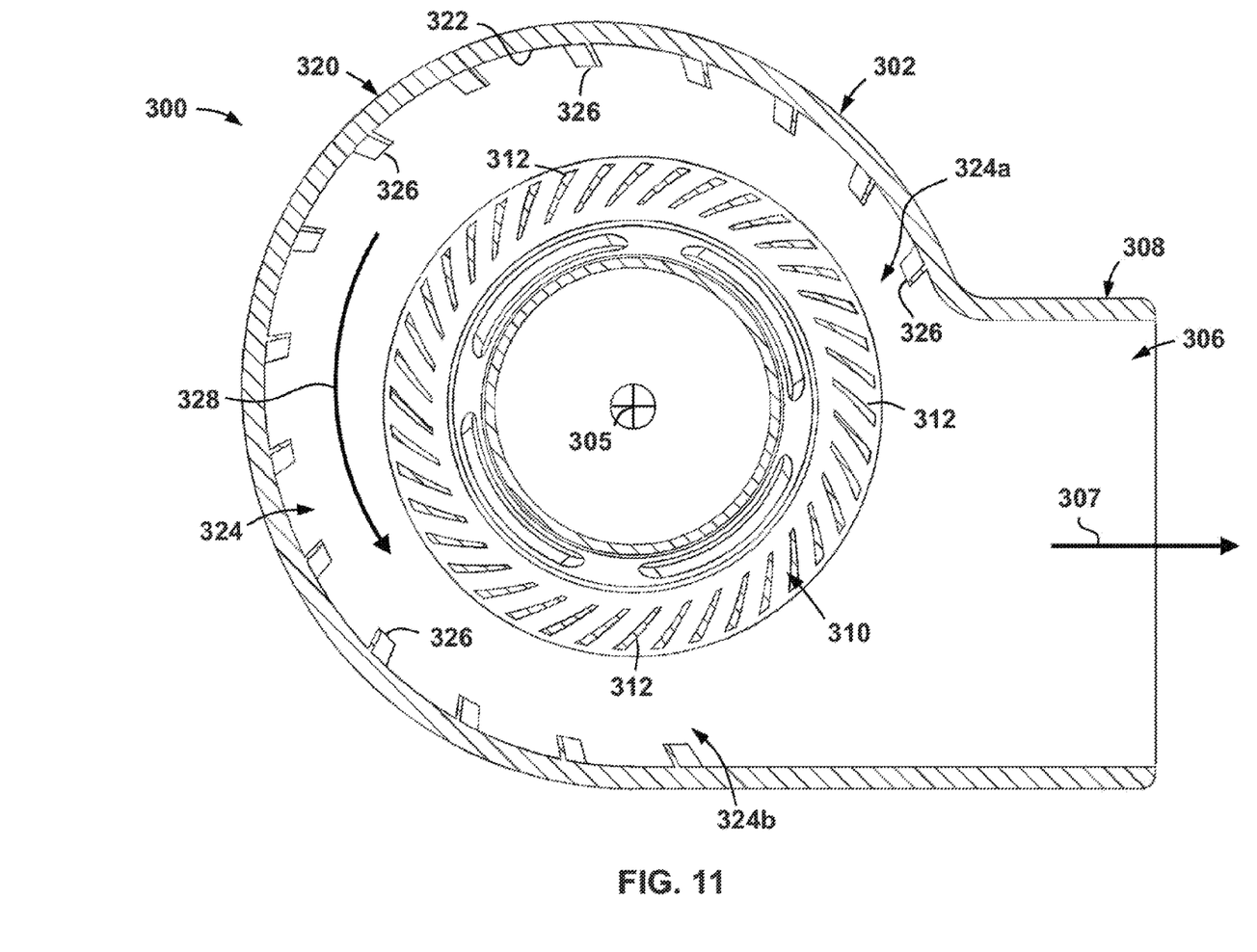
FIG. 11 is a cross-sectional view taken along section 11-11 in FIG. 10.

Referring now to FIGS. 10 and 11, housing 302 includes a curved wall 320 that extends axially between sides 302a, 302b and an outlet duct 308. Outlet duct 308 defines outlet 306, and curved wall 320 extends from either side of outlet duct 308. In addition, filter 300 includes a fan or impeller 310 disposed within inlet 304 that includes a plurality of blades 312. As best shown in FIG. 11, fan 310 is coaxially aligned with axis 305 such that an outlet flow path 324 is defined radially between fan 310 (particularly blades 312)

and a radially outer surface 322 within housing 302 that is formed by wall 320. Outlet flow path 324 includes a first or upstream end 324a and a second or downstream end 324b. In this example, ends 324a, 324b are at (or proximate to) the intersections between curved wall 320 and outlet duct 308 of housing 302. Fluids (e.g., air) flowing along outlet flow path 324 toward downstream end 324b are generally directed to and out of outlet 306 of housing 302 during operations. Because of the curvature of curved wall 320, outlet flow path 324 extends angularly about axis 305 (e.g., flow path 324 spirals outward from axis 305 in some examples) between ends 324a, 324b.

During operations, fan 310 is rotated about axis 305 such that fluid (e.g., air) is drawn into inlet 304 of housing 302 along flow direction 303. In particular, blades 312 are shaped and arranged such that when fan 310 is rotated about axis 305, a negative pressure is created at inlet 304 that draws in fluid from the environment surrounding filter 300. As best depicted in FIG. 11, once fluid is drawn into inlet 304, the blades 312 of fan 310 impart a centrifugal force to the fluid within the housing 302 such that the fluid is flowed radially outward toward radially outer surface 322. In this example, the fan 310 is rotated in a counter-clock wise direction as shown in FIG. 11, and thus, as the fluid (e.g., air) is directed radially outward toward radially outer surface 322, it is also generally directed in a counter clock-wise direction about axis 305 and therefore along flow direction 328 of outlet flow path 324.

Referring now to FIG. 11, in this example, radially outer surface 322 within housing 302 includes a plurality of vanes 326 that are substantially the same as the vanes 116, 126 previously described above (see e.g., FIGS. 4-8). Thus, as the fluid flows along outlet flow path 324 as previously described, particles (e.g., particles 150 shown in e.g., FIGS. 5-8) are engaged with and therefore captured by vanes 326 while the fluid continues to advance toward outlet 306 in generally the same manner as described above for filter 100 (see e.g., FIGS. 5-8).

During the above described operations, fan 310 may be rotated about axis 305 with any suitable driver. For instance, in some examples, fan 310 is rotated about axis 305 by a motor (e.g., electric motor, magnetic motor, hydraulic motor, etc.) that is disposed within housing 302 or that is external to housing 302. In the interest of brevity and to simplify the figures, a driver for fan 310 is not expressly depicted.

Referring again to FIGS. 10-11, in some examples, during the above described operations, the vanes 326 may be arranged, shaped, and angled as previously described for vanes 116, 126 (see FIGS. 5-8) such that captured particles (e.g., particles 150) are directed toward first side 302a or second side 302b of housing 302. Thus, in these examples, first and second sections 301 and 309, respectively, of housing 302 may be detached from one another and then either cleaned or replaced as previously described to remove captured particles from within filter 300.

Figure 12:
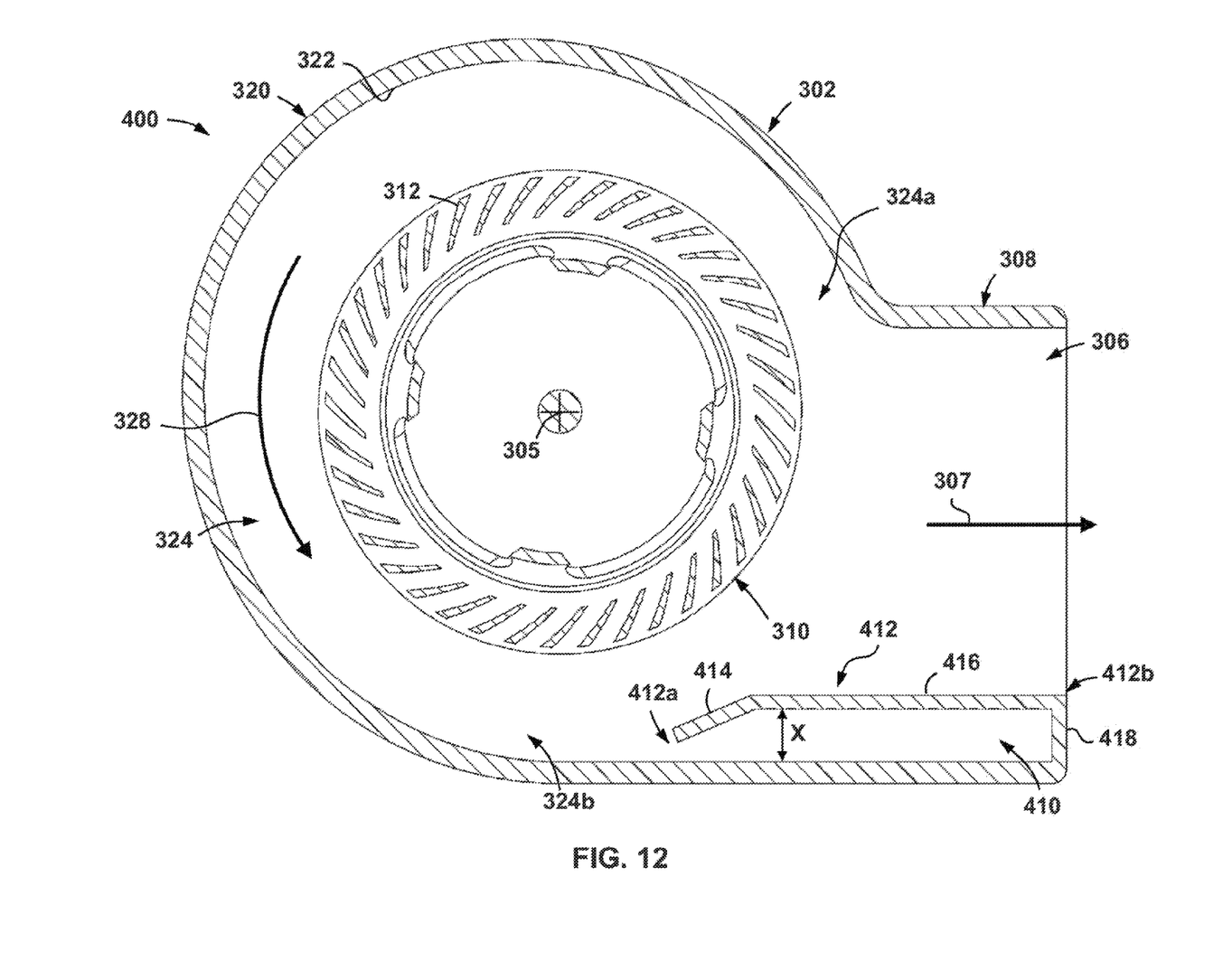
FIG. 12 is a side cross-sectional view of a filter for use within the printer of FIGS. 1 and 2 according to some examples.

Referring now to FIG. 12, an example filter 400 for use within printer 10 as filter 50 (see FIGS. 1 and 2) is shown. Filter 400 is generally the same as filter 300, previously described and, thus, components of filter 400 that are shared with filter 300 are identified with like reference numerals and the discussion below will focus on the features of filter 400 that are different from filter 300. In particular, filter 400 includes housing 302 of filter 300, except that no vanes 326 (see FIG. 11) are included along radially outer surface 322.

In addition, a recess 410 is formed within outlet duct 308 at outlet 306 that extends axially between sides 302a, 302b (see e.g., FIG. 10), and is defined by a plate 412. Plate 412 includes a first or upstream end 412a and a second or downstream end 412b. In this example, downstream end 412b is disposed at outlet 306 and upstream end 412a is disposed proximate to downstream end 324b of outlet flow path 324. Plate 412 includes a first or upstream section 414 extending from upstream end 412a and a second or downstream section 416 extending from upstream section 414 to downstream end 412b. Plate 412 (including upstream section 414 and downstream section 416) is generally spaced from an inner wall of outlet duct 308 such that recess 410 is formed between plate 412 and outlet duct 308 and extends from upstream end 412a of plate 412 to a terminal surface or wall 418 disposed at downstream end 412b of plate 412. In this example, downstream section 416 extends generally parallel to the flow direction 307 at outlet 306, and upstream section 414 extends linearly from downstream section 416 toward inner wall of housing 302. Thus, in this example, a gap X extending between outlet duct 308 and plate 412 may be smaller at upstream end 412a than at other points along plate 412 (e.g., such as proximate to downstream end 412b).

Referring still to FIG. 12, during operations as fluid is flowed along outlet flow path 324 and particles suspended therein are generally directed or forced toward radially outer surface 322 as previously described, the particles suspended within the fluid may be directed under plate 412, thereby separating the particles from the fluid flowing within housing 302. In particular, because the particles (e.g., particles 150 previously described—see e.g., FIGS. 5-8) are directed radially outward toward radially outer surface 322 as previously described, they are channeled or flowed under upstream end 412a of plate 412 and are therefore captured within recess 410. However, during these operations, the fluid (e.g., air) flowing through housing 302 is generally deflected away from recess 410 by the upstream section 414 of plate 412 so that the fluid may then emerge from housing 302 at outlet 306 along flow direction 307.

In the examples described herein, filters are provided for separating suspended particles from a fluid stream (e.g., filters 100, 300, 400, etc.). Accordingly, through use of the example filters disclosed herein, the amount of suspended particles contained within a fluid stream (e.g., such as a fluid stream within a printer) may be reduced or eliminated entirely.

In FIGS. 1 and 2 fluid flow paths 30, 40 have been shown that are coupled to printing assembly 20. However, it should be appreciated that printer 10 may have other fluid flow paths (e.g., in addition to or in lieu of fluid flow paths 30, 40) that are not coupled to printing assembly 20 and that may include a filter according to the examples disclosed herein (e.g., filters 100, 300, 400, etc.). In addition, it should also be appreciated that some examples of filter 400 may also include the vanes 326 in addition to recess 410 (see e.g., FIGS. 11 and 12).

The above discussion is meant to be illustrative of the various examples of the present disclosure. Numerous variations and modifications will become apparent to those skilled in the art once the above disclosure is fully appreciated. It is intended that the following claims be interpreted to embrace all such variations and modifications.

What is claimed is:
1. A filter, comprising:
   a housing including a central axis, an inlet, and an outlet, wherein the central axis extends perpendicularly to a fluid flow direction at the outlet;
   an outlet flow path defined within the housing that extends angularly about the central axis to the outlet; and a first plurality of vanes extending from a radially outer surface of the outlet flow path.

2. The filter of claim 1, comprising:
an inlet flow path defined within the housing that spirals inward toward the central axis from the inlet,
wherein the central axis extends perpendicularly to a fluid flow direction at the inlet; and
wherein the outlet flow path spirals outward from the central axis to the outlet.

3. The filter of claim 2, comprising:
a second plurality of vanes extending from a radially outer surface of the inlet flow path.

4. The filter of claim 1, wherein the first plurality of vanes extend from the radially outer surface of the outlet flow path at a non-zero angle that is less than 90° relative to the radially outer surface of the outlet flow path.

5. The filter of claim 1, wherein the first plurality of vanes includes a base at the radially outer surface of the outlet flow path and a top spaced from and disposed upstream from the base.

6. The filter of claim 1, wherein the housing includes a first side and a second side opposite the first side along the central axis, and wherein the housing comprises a wall disposed at the second side that is detachable from a remaining portion of the housing.

7. The filter of claim 6, wherein the wall is to capture particles flowing within the housing.

8. The filter of claim 1, comprising:
a plate extending along the radially outer surface of the outlet flow path; and
a recess defined between the plate the radially outer surface.

9. The filter of claim 1,
wherein the inlet extends axially into the housing; and
wherein the filter comprises a fan disposed within the inlet to draw fluid into the housing.

10. A printer, comprising:
a printing assembly to print an image on print media;
a fluid flow path fluidly coupled to the printing assembly;
a filter disposed along the fluid flow path that is to filter particles from a fluid flowing along the fluid flow path, wherein the filter comprises:
a housing including a central axis, an inlet, and an outlet, wherein the central axis extends perpendicularly to a fluid flow direction at the outlet;
an outlet flow path defined within the housing that extends angularly about the central axis to the outlet; and
a first plurality of vanes extending from a radially outer surface of the outlet flow path.

11. The printer of claim 10, wherein the fluid flow path is an exhaust for flowing fluids from the printing assembly to an atmosphere surrounding the printer.

12. The printer of claim 10, wherein the fluid flow path is an inlet for flowing fluids from an atmosphere surrounding the printer to the printing assembly.

13. The printer of claim 10, wherein the housing includes a first side and a second side opposite the first side along the central axis, and wherein the housing comprises a wall disposed at the second side that is detachable from a remaining portion of the housing.

14. A filter, comprising:
a housing including a central axis, an inlet, and an outlet, wherein the central axis extends perpendicularly to a fluid flow direction at the inlet and the outlet;
an inlet flow path defined within the housing that spirals inward toward the central axis from the inlet;
an outlet flow path defined within the housing that extends angularly about the central axis to the outlet; and
a plurality of vanes extending from a radially outer surface of the outlet flow path and a radially outer surface of the inlet flow path.

15. The filter of claim 14, wherein the housing includes a first side and a second side opposite the first side along the central axis, and wherein the housing comprises a wall disposed at the second side that is detachable from a remaining portion of the housing.

* * * * *